(12) United States Patent
James

(10) Patent No.: US 11,746,835 B1
(45) Date of Patent: Sep. 5, 2023

(54) TORQUE LIMITER WITH AUTOMATIC RESET ABILITY

(71) Applicant: Brunel Corporation, Wichita Falls, TX (US)

(72) Inventor: Jerome James, Wichita Falls, TX (US)

(73) Assignee: Brunel Corporation, Wichita Falls, TX (US)

( * ) Notice: Subject to any disclaimer, the term of this patent is extended or adjusted under 35 U.S.C. 154(b) by 0 days.

(21) Appl. No.: 17/752,569

(22) Filed: May 24, 2022

(51) Int. Cl.
  F16D 43/208 (2006.01)
  F16D 43/206 (2006.01)

(52) U.S. Cl.
  CPC ......... F16D 43/208 (2013.01); F16D 43/206 (2013.01)

(58) Field of Classification Search
  CPC ........ F16D 43/206; F16D 43/208; F16D 7/08; F16D 7/10
  See application file for complete search history.

(56) References Cited

U.S. PATENT DOCUMENTS

| | | | | |
|---|---|---|---|---|
| 3,893,553 A * | 7/1975 | Hansen | ................. | F16D 43/204 464/36 |
| 3,985,213 A * | 10/1976 | Braggins | ................... | F16D 7/08 464/36 |
| 6,059,087 A * | 5/2000 | Parry | ...................... | F16D 7/005 192/56.54 |
| 8,162,246 B2 * | 4/2012 | Long | ...................... | B02C 17/24 241/101.2 |
| 9,086,096 B2 * | 7/2015 | Long | ........................ | F16D 7/10 |
| 9,255,612 B2 * | 2/2016 | Hauptmann | .............. | F16D 7/08 |
| 2015/0094155 A1 * | 4/2015 | Franceschi | ............ | F16D 43/206 464/32 |

FOREIGN PATENT DOCUMENTS

DE 102019110297 B3 * 6/2020

* cited by examiner

*Primary Examiner* — Lori Wu
(74) *Attorney, Agent, or Firm* — Cynthia S. Lamon; Lamon Patent Services

(57) ABSTRACT

A torque limiter assembly includes a first rotational form mounted to a driving component of rotational dive system the first rotational form adapted to receive a second rotational form mounted to a driven component, the forms rotational over a shared hub, the second form adapted to engage to and be disengaged from the first form by a plurality or disconnect assemblies spaced equally around and mounted through a sidewall of the first rotational form, each disconnect assembly a spring assisted piston and a tensioner adapted to engage a detent in the second rotational form, the disconnect assemblies operable in unison to disengage from the second rotational form from the first rotational form upon detection of breach of a torque load threshold value set for each of the disconnect assemblies.

17 Claims, 8 Drawing Sheets

Section AA

TORQUE LIMITER WITH AUTOMATIC RESET ABILITY

BACKGROUND OF THE INVENTION

1. Field of the Invention

The present invention is in the field of mechanical force limiting devices and pertains particularly to methods and apparatus for limiting torque in drive components to protect the mechanical integrity of and safety of use of those components.

2. Discussion of the State of the Art

In the mechanical arts, a force limiting component refers to any mechanical component or assembly that governs a translation of force from a drive component or assembly to a driven component or assembly of a mechanical system with a design focus on force dispersion and limitation in the event that applied force exceeds a preset threshold for one or more components of the mechanical system.

Force limiting mechanics operate as an interface between the driving component and the one or more driven components to provide disengagement and re-engagement between the components and or frictional displacement between the components in assembly or complete disengagement of the force load through a sacrificial safety module or shear pin assembly. A slip-clutch or an overload clutch is one example of a torque limiter.

In the general art there are challenges with current art torque limiters including requirement of lubricants, pneumatic fluids, and external power sources to operate. Rigid, inflexible components, for example bearings, are commonly damaged and incur wear making them inoperable requiring high maintenance routines. In some types of torque limiters, manual resetting of engagement to the drive component is required. In some automatic reset torque limiters, the re-engagement to the drive component is delayed rather than expedited. Furthermore, typical components of limiters including ball bearing assemblies can suffer erosion under load and cause brinelling that may further degrade the bearing race track and housing assemblies. Unpredictability relative to overload conditions for a torque limiter may also contribute to more downtime or less productivity for a working system that relies on drive components being mostly engaged for productivity.

Therefore, what is clearly needed is a torque limiter assembly that eliminates or reduces the challenges faced with current art assemblies including bearings.

BRIEF SUMMARY OF THE INVENTION

A torque limiter is provided, comprising a first rotational form mounted to a driving component of a rotational drive system. A second rotational form mounted to a driven component of the rotational drive system is also provided, the second rotational form adapted to interface with the first rotational form over an inner hub, the second rotational form adapted to be disengaged from the first rotational form and enabled to be reengaged to the first rotational form. In this embodiment, a pair of ring bearings are provided supporting rotation of the first and second rotational forms over the inner hub.

A plurality of disconnect assemblies are mounted at equally spaced positions radially about the first rotational form, the plurality of disconnect assemblies extending through the side wall of the first rotational form toward center of the first rotational form, the plurality of disconnect assemblies cylindrical in form including a tensioner housing, a piston, a tensioner, and a spring assembly concentrically aligned, the plurality of disconnect assemblies further including a torsion spring-operated release lever orthogonally positioned to the longitudinal direction of the rotational drive system.

In operation, the plurality of disconnect assemblies function in unison to disengage the second rotational form from the first rotational form upon detection of a transmission torque overload beyond a threshold torque value set in torque adjustments made to the individual ones of the plurality of disconnect assemblies. In this embodiment, the driving component of the torque limiter is a drive shaft. In one embodiment, after disengagement of the second rotational form from the first rotational form, reengagement of the forms occurs by reversing direction of the rotational drive system.

In another embodiment, after disengagement of the second rotational form from the first rotational form, reengagement of the forms may be performed manually with the rotational drive system in a neutral state. In all embodiments, individual torque adjustment tensioners are provided to each of the plurality of disconnect assemblies to enable application of a torque threshold value to the plurality of disconnect assemblies. Additionally, the pair of ring bearings may be annular ball bearing rings manufactured of a semi-pliable material from a list including nylon, various pliable polymers, metallic materials and graphite.

In another embodiment, the compression spring assembly includes two springs and two spring sleeves wherein the spring sleeves are disposed to the inside diameters of the springs and wherein one spring has an outside diameter small enough to fit inside of an inside diameter of the other spring. In this embodiment, in each of the plurality of disconnect assemblies, the compression spring assembly is disposed within the piston and wherein the torsion spring-operated release lever is forced to pivot to occupy a step-down ledge on the piston locking the compression spring assembly within the piston into a compressed state separating the piston from the tensioner disengaging the second rotational form from the first rotational form. Additionally, each of the plurality of disconnect assemblies may further include a rotationally dampened reset lever adapted to engage the release lever during reverse rotation of the first rotational component pulling the release lever off the step-down ledge on the piston housing releasing the piston to reengage the tensioner.

A further embodiment provides that the pair of ring bearings may be flat rings with no moving parts fabricated from a high temperature polymer material, or a high-grade graphite material.

DETAILED DESCRIPTION OF THE INVENTION

In various embodiments described in enabling detail herein, the inventor provides a unique torque limiter assembly with auto-reset capability. It is a goal of the present invention to provide a torque limiter that is automatically resettable in reverse of current direction of drive revolution. It is a further goal of the present invention to provide a torque limiter that is not susceptible to brinelling damage or other types of metal denting or scarring caused by chattering or component vibration. The present invention is described using the following examples, which may describe more than one relevant embodiment falling within the scope of the invention.

Figure 1A:
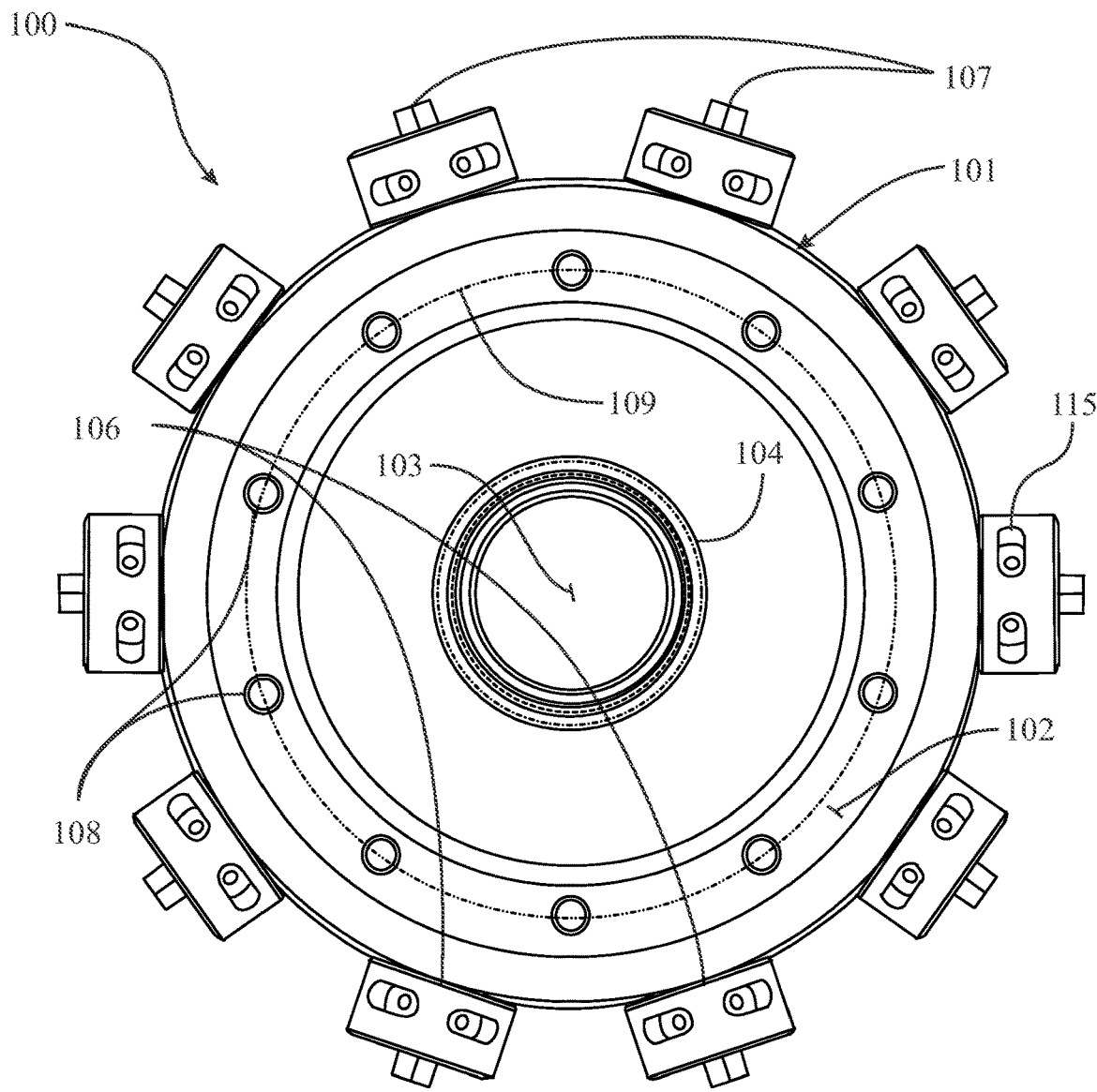
FIG. 1A is a top elevation view of a torque limiter assembly according to an embodiment of the present invention.

FIG. 1A is a top view of torque limiter assembly 100 according to an embodiment of the present invention. Torque limiter assembly 100 is an axial assembly that may be operated to disengage a driven component from a driving component of a rotating mechanical drive line upon detection of overload of torque force transferred by the driven component. Torque limiter assembly 100 may be operated to disengage the driven component from the driving component and reset engagement of the driven component to the driving component in an automated fashion. In another embodiment, torque limiter assembly 100 can be mounted in either direction (driving or driven sides) for operational rotation preference.

Torque limiter assembly 100 is annular and includes two main rotational coupling bodies, more particularly a tensioner carrier 101 and a piston carrier 102 mounted over an inner hub 103 that has an outside diameter just smaller than the inside diameter of a pair of ball bearings 104 that provide the capability for piston carrier 102 and tensioner carrier 101 to rotate independently of one another when disengaged. In this embodiment ball bearings 104 may be manufactured of a variety of materials, some being pliable allowing deformation and custom fit between components enabling movement, vibration absorption and adapting to slight displacement. Additionally, these bearings 104 are easily cut, stamped and/or otherwise formed from said pliable material easily and on-site. These materials include anyone of nylon, various pliable polymers, metallic materials and graphite.

Tensioner carrier 101 is annular in this embodiment having a sidewall of uniform depth, an internal volume defined by depth and diameter and a closed end for mounting to a driving rotational component (not illustrated) such as a driving shaft. Tensioner carrier 101 may be a machined component fabricated to specification from a low alloy steel such as American Iron and Steel Institute (AISI) rated 4140. Steel rated 4140 is not absolutely necessary to practice the invention as the material can be any suitable steel or other alloy metal that is heat treated and hardened to a degree to provide durability during use while maintaining some flexibility, for example Rockwell C scale at 35-50. Tensioner Carrier 101 is open at one side for accepting piston carrier 102 concentrically therein.

Piston carrier 102 is an annular component that has an outside diameter that is just smaller than the inside diameter of tensioner carrier 101 and fits concentrically within the carrier in assembly over a shared bearing (104) and hub (103) assembly. Piston carrier 102 may be machined to specification from AISI 4140 steel or similarly rated alloy, specified above. Piston carrier 102 includes a flanged top surface and an annular sidewall not visible in this view. Piston carrier 102 may be mounted to a driven component (not illustrated) on the flange side via a number of machine-threaded blind openings 108 equally spaced on a bolt circle 109 concentric to the longitudinal axis of the assembly.

Tensioner carrier 101 supports a number of disconnect assemblies 106 mounted to the sidewall of the carrier. Disconnect assemblies 106 are, in this embodiment, spring loaded, tensioner type assemblies inserted through openings provided equally spaced apart around the sidewall of tensioner carrier 101. In this embodiment there are ten disconnect assemblies mounted to the sidewall of tensioner carrier 101 at approximately 36 degrees angular separation from center line to center line. There may be more than ten or fewer than ten disconnect assemblies 106 mounted to the outer surface of the sidewall of tensioner carrier 101 without departing from the spirit and scope of the present invention. In a preferred embodiment all of the assembled annular components are balanced in assembly to reduce vibrations during rotation in independent form and in unison.

Disconnect assemblies 106 are elongate linear tensioner assemblies that may be individually triggered by spring and lever at a same instant that overload of torque force beyond an established threshold is detected present on the drive side of the assembly. Each disconnect assembly includes a threaded tensioner 107 at true center of the disconnect housing. Tensioners 107 may be turned to increase or decrease the level of spring tension in the disconnect assembly. In a preferred embodiment, all tensioners 107 are tensioned equally to a specific foot pound (ft/lb) torque setting compressing the springs in each assembly to a same tension amount.

Figure 1B:
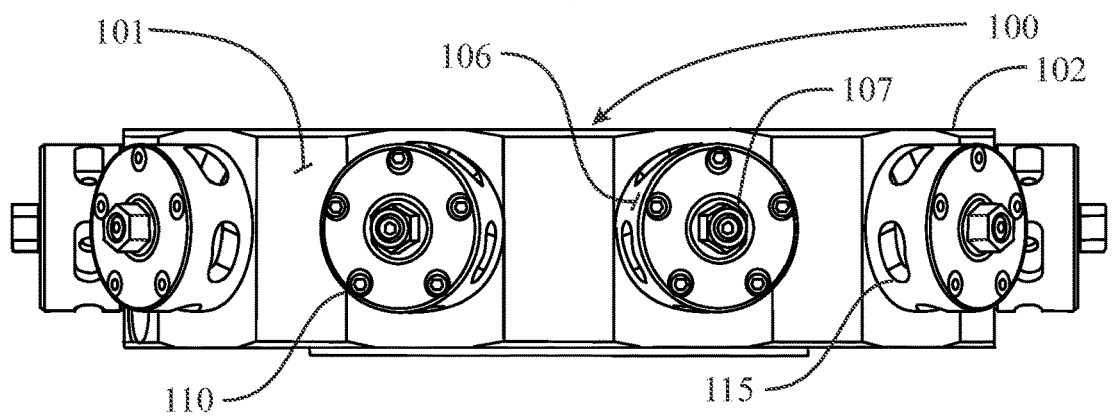
FIG. 1B is a side elevation view of the torque limiter assembly of FIG. 1A.

FIG. 1B is a side elevation view of torque limiter assembly 100 of FIG. 1A. Torque limiter assembly 100 in side view reveals that machined flats are provided on the outside surface of tensioner carrier 101 to support the mounting footprints required for disconnect assemblies 106. Disconnect assemblies 106 are each mounted to a flat via mounting machine screws threaded through female threaded mounting openings provided for the purpose. An identical pattern of through openings may be provided through the top surface of each disconnect assembly tensioner housing.

In this case machine screws 110 are arranged in a five point pattern on a bolt circle provided concentrically to the tensioner 107 about the top face of disconnect assembly 106, the same five point pattern provided through the machined flat surface of the sidewall of tensioner carrier 101 at each mounting flat for a disconnect assembly 106, the five point patterns of openings for screws 110 aligning to accept machine screws 110 through the tensioner housing of the disconnect assembly and into the machined flat the openings threaded through or into the sidewall openings of the five point pattern in 101. There may be more or fewer openings per pattern without departing from the spirit and scope of the present invention. For example, there may be 8, 9 or as many as 20, depending on diameter of 101.

Other mounting patterns and hardware might be used to mount disconnect assemblies 106 to the mounting positions around tensioner carrier 101 without departing from the spirit and scope of the present invention. In a preferred embodiment, the visible portion of disconnect assemblies 106 in this view, or the tensioner housings 301, are machined to specification and fabricated from AISI 4140 or a low alloy steel equivalent.

Referring now back to FIG. 1A, each tensioner housing 301 of each disconnect assembly 106 includes multiple, in this case five, material relief slots 115 also visible in FIG. 1B, are machined through the sidewall of each tensioner housing of each disconnect assembly 106, the slots 115 equally spaced about the tensioner housing 301 at a radial 72 degrees from center line to center line, the slots providing material relief for securing 302 while adjustment of torque of tensioner 303. For example, a rigid rod of a diameter to insert through slots 115 allow one to keep 301 from rotating when adjusting tensioner 303.

Figure 1C:
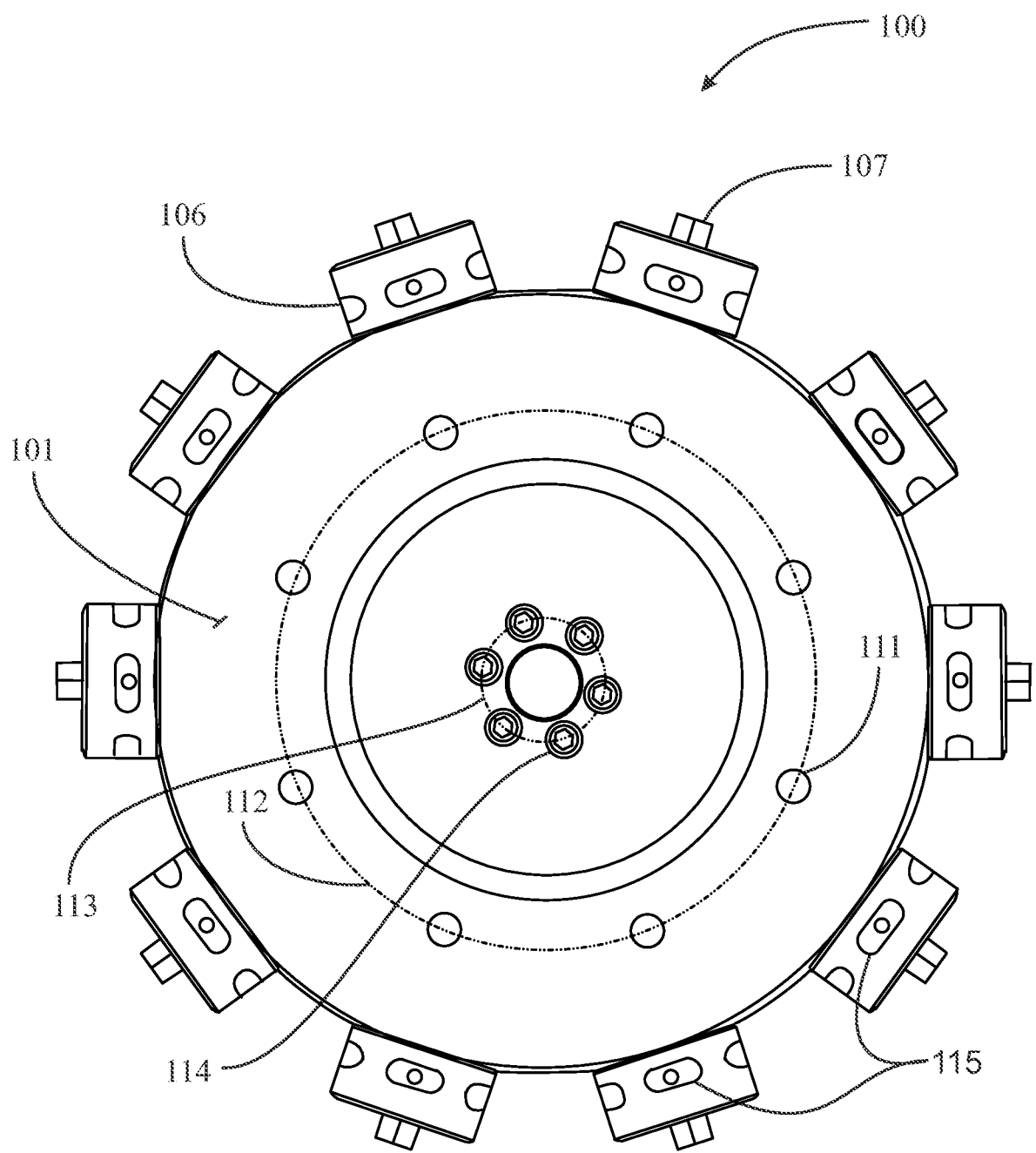
FIG. 1C is a bottom elevation view of the torque limiter assembly of FIG. 1A

FIG. 1C is a bottom view of torque limiter assembly 100 of FIG. 1A. In this view, torque limiter assembly 100 is depicted from the perspective of the drive component side of a mechanical drive system. Tensioner carrier 101 includes a plurality of threaded mounting openings 111 provided through the rear face of the carrier. In this embodiment, openings 111 are provided on a bolt circle 112 concentric to the central axis of tensioner carrier 101 and radially spaced apart from center line to center line. Openings 111 enable mounting of tensioner carrier 101 concentrically to a drive component such as a drive shaft. Bolts may be used to mount tensioner carrier 101 to the drive component.

Tensioner carrier 101 also includes a plurality of machine screws 114 placed through a pattern of openings provided through the rear face and equally spaced on bolt circle 113. Machine screws 114 are equally spaced at 60 degrees radially center line to center line. Machine screws 114 are each threaded into the rear wall of hub 103 holding the assembly together in a state of coupling wherein both rotational components rotate in the same direction at the same speed. There are six machine screws 114 in this embodiment. There may be more or fewer machine screws 114 and aligned openings without departing from the spirit and scope of the present invention.

Figure 2:
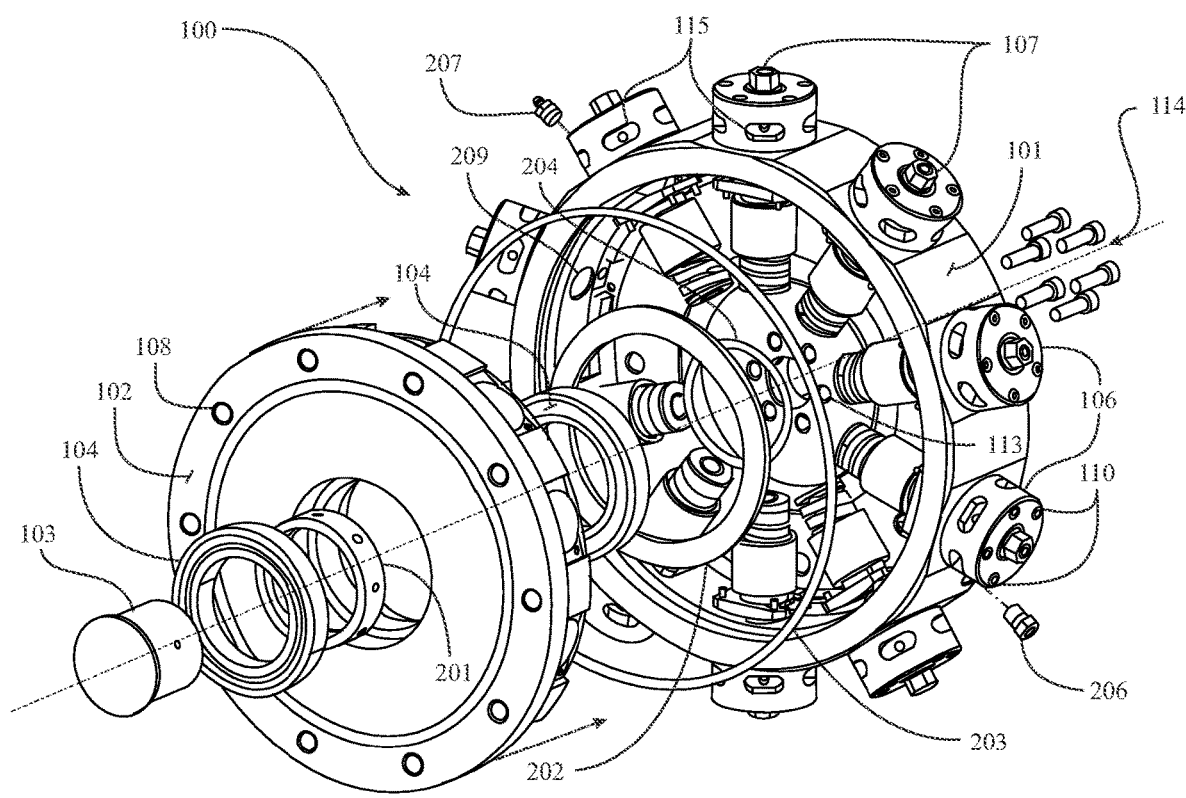
FIG. 2 is an exploded view of the torque limiter assembly of FIG. 1A.

FIG. 2 is an exploded view of torque limiter assembly 100 of FIG. 1A. Disconnect assemblies 106 extend orthogonally through the sidewall of carrier. In this view one of the tensioner assemblies is removed in this view to reveal opening 209 of which there are ten total provided through the sidewall of tensioner carrier 101. In this embodiment all of the components included in torque limiter assembly 100 are concentric to the drive line of the drive system while the disconnect assemblies 106 present orthogonally to the drive line at equal angular spacing of 36 degrees. Torque limiter assembly 100 includes a thrust bearing (SKF brand) designed to resist axial load forces occurring in the same direction as the drive line or shaft. In this view both ball bearing rings 104 are depicted. Ball bearing rings 104 are SKF brand bearings designed to resist radial load forces directed that are occurring perpendicularly to the drive line or shaft.

Ball bearing rings 104 are spaced apart by a press ring 201 that limits the axial movement between the bearings and supports the fixed position of the bearings. Press ring 201 may be fabricated of AISI 4140 or another low alloy steel. Torque limiter assembly includes a spacer ring 204. Spacer ring 204 is provided to concentrate the axial load to ball bearing rings 104, and enables piston carrier 102 to rotate independent of tensioner carrier 101. Spacer ring 204 may be machined from AISI 1018 grade steel or an equivalent mild low-carbon steel. Additionally, torque limiter assembly 5 includes an Oring seal 203 positioned between tensioner carrier 101 and piston carrier 102 and a thrust washer 202.

Figure 3:
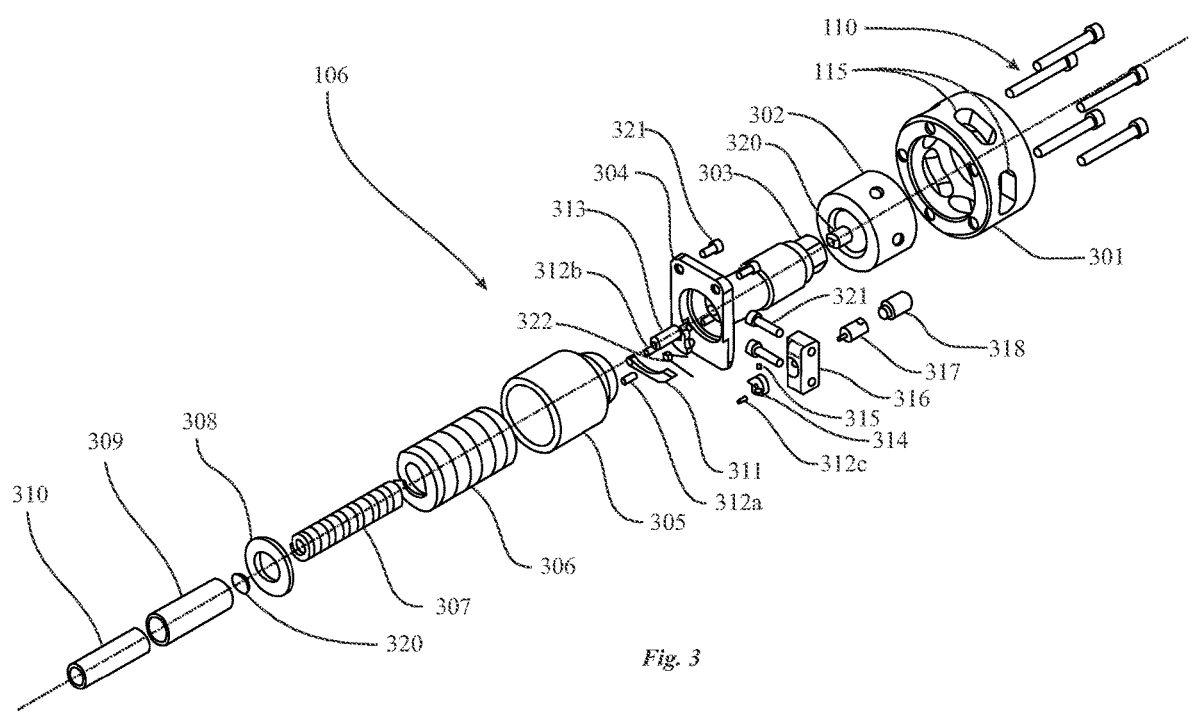
FIG. 3 is an exploded view of a disconnect assembly of the torque limiter assembly of FIG. 1A.

FIG. 3 is an exploded view of disconnect assembly 106 of the torque limiter assembly of FIG. 1A. Disconnect assembly 106 allows for the transmission of torque from the driving component (carrier 101) and the driven component (piston carrier 102) in torque assembly 100. There may be fewer disconnect assemblies (as few as one) provided than are depicted in this example without departing from the spirit and scope of the present invention. The only portion of disconnect assembly 106 that is visible outside of the torque limiter assembly is a disconnect assembly tensioner housing 301 also visible in the previous Figs. Disconnect assembly tensioner housing 301 includes material relief slots 115 through the sidewall thereof. Tensioner housing 301 may be machined from AISI 4140 steel. Threaded machine screws 110 connect tensioner housing 301 to the flat machined surface of the carrier (101) sidewall at all positions.

Disconnect assembly 106 includes a cylindrical tensioner nut 302 having an outside diameter just smaller that the inside diameter of tensioner housing 301. Tensioner nut 302 may be machined from AISI 4140 or low alloy equivalent. In assembly, tensioner nut 302 is retained within the confines of tensioner housing 301. Tensioner nut 302 connects in line to a tensioner 303 via a socket head cap screw (SHCS) 320 plugs a hole that otherwise present in order to keep contamination out of tensioner 303.

Tensioner 303 engages in operation with an in-line cylindrical spring-loaded torque piston 305 to communicate tangential force requirements per station for all of the disconnect assemblies. Torque piston 305 is cylindrical and may be machined from a D2 high carbon tool steel or equivalent. Disconnect assembly 106 includes a retainer cap 304. Retainer cap 304 fits over torque piston 305 and restricts off center movement of the torque piston. Retainer cap 304 provides mounting support for a release lever 311 operated in part by a torsion spring 322. Torsion spring 322 supplies the force for moving release lever 311 into the ledge position to lock torque piston 305 into the disengagement position. Retainer cap 304 may be machined from AISI 4140 steel or equivalent.

Release lever 311 functions to lock torque piston 305 into position upon disengagement of the torque limiter assembly 100 and to release torque piston 305 from that locked position upon re-engagement of torque limiter assembly 100 using a reset lever 314. Release lever 311 may be machined from AISI 4140 steel or equivalent. In this embodiment, disconnect assembly 106 further includes a damper assembly including a rotary damper unit 317 (WEBFORMA brand) that connects to reset lever 314. Rotary damper unit 317 functions to absorb shock force to reset lever 314, which engages release lever 311 to enable reset of the lever 311 to re-engage the torque limiter assembly 100 or more particularly to release torque piston 305 from the locked ledge position for re-engagement with tensioner 303. This function happens in unison at the same instant for all of the disconnect assemblies 106 provided to the torque limiter assembly 100.

A rectangular mounting block 316 is provided in assembly, the mounting block having a centered material relief opening provided therein to house rotary damper unit 317 and reset lever 314. Reset lever 314 is further supported by a socket head set screw 315. Set screw 315 serves to hold reset lever 314 on to damper unit 317. Damper unit 317 is secured into the mounting block 316 via a socket head set screw 318. Other supporting hardware implements in the assembly include set screw 313, dowel pins 312a, 312b, and 312c, and socket head screws 321 to secure the mounting block and position of the resetting and dampening components for operation.

Disconnect assembly 106 further includes compression springs 306 and 307. Compression spring 306 is the larger diameter of the two compression springs and fits within the inside diameter of torque piston 305. A spring sleeve 309 fits within the inside diameter of compression spring 306. The smaller diameter compression spring 307 fits within the inside diameter of spring sleeve 309. A smaller diameter spring sleeve 310 is provided and fits within the inside diameter of the smaller compression spring 307, thus completing the compression spring assembly inside the torque piston 305. Two spacers are included in the compression spring assembly for tension adjustment purposes. These are spacers 308 for compression spring 306, and spacer 320 for compression spring 307.

Referring now back to FIG. 2, torque limiter assembly 100 remains engaged or coupled to translate rotational motion in a same direction from a driving component to a driven component in the larger mechanical application as a primary state. The disconnect assemblies 106 may be forced to simultaneously separate the torque pistons from the tensioners linearly in each assembly thus disengaging or uncoupling the main torque limiter rotational components, the tensioner carrier 101 and the piston carrier 102 enabling independent rotation of the primary rotational components (disengagement).

Referring now to FIG. 3, when the level of torque translated from the drive component into the torque limiter assembly 100 rises to a threshold limit, the release levers 311 in each assembly are forced or moved by torsion spring to a ledge position that accomplishes the separation of the torque piston and tensioner compressing the springs 306 and 307, effectively locking the torque limiter in that state. In that sense, torque limiter assembly 100 may be classed as a type of ball/detent torque limiter. The torque force threshold limit may be set in incremental adjustments in each one of the multiple disconnect assemblies using tensioner nut 302. During disengagement, the reset lever 314 rotates over the release lever each sequential rotation until rotation stops. Damper unit allows the reset lever to rotate to dampen shock to the release lever.

In one embodiment, resetting torque limiter 100 to engage or couple to the drive line (re-engagement) requires a reversal of rotational direction in the drive component. More particularly reversing direction causes the reset lever 314 to engage release lever 311, pulling it off of a diameter step or ledge of torque piston 305 allowing the springs 306 and 307 to decompress to force re-coupling of the torque piston with the tensioner 303 in each of the disconnect assemblies at the same instant. Full engagement of the torque limiter 100 may be achieved within one reverse revolution of the drive line or shaft, resetting happening automatically.

In this embodiment, sensing torque load beyond a threshold is mechanical and determined by each disconnect assembly through the torsion spring 322. In this embodiment, no outside equipment or components are required to assess load or to trip or reset the limiter assembly. All functional components are self-contained within the assembly footprint and are performed from within the torque limiter assembly. In one embodiment, the inventor provides an alternative to roller bearings or other metallic bearings for general torque limiter and clutch applications of varying types.

Figure 4:
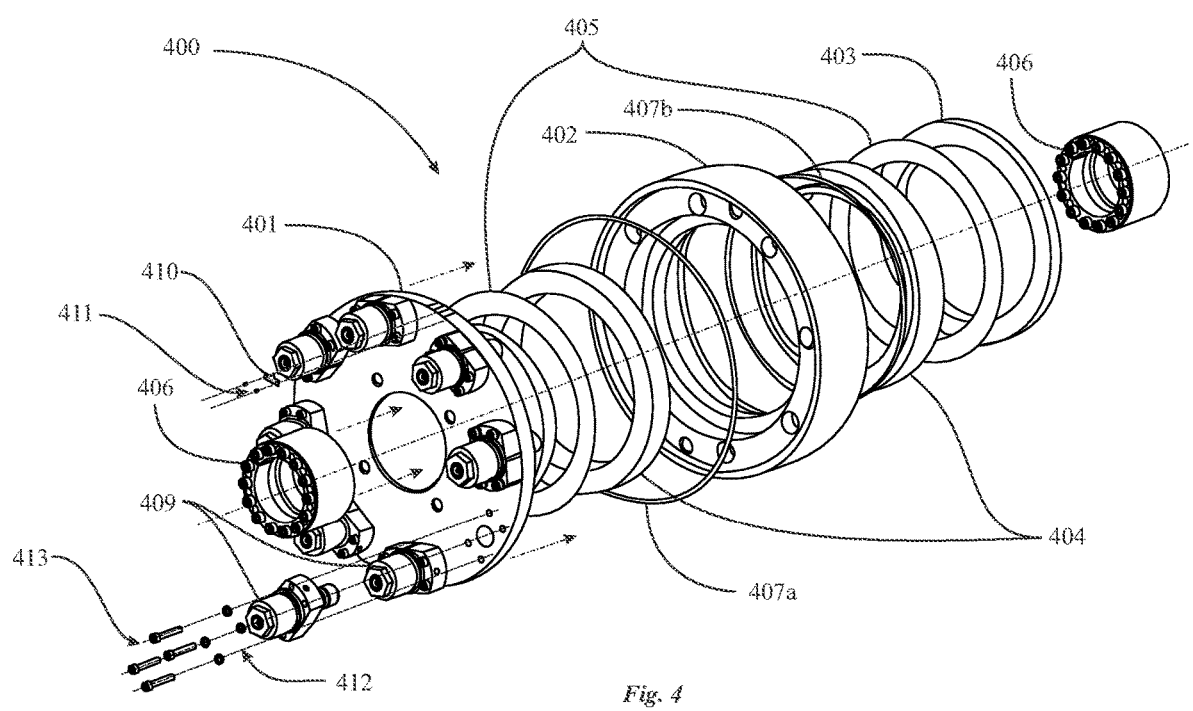
FIG. 4 is an exploded view of a torque limiter assembly according to another embodiment of the present invention.

FIG. 4 is an exploded view of a torque limiter assembly 400 according to another embodiment of the present invention. Torque limiter assembly 400 is, in this application, a axial ball/detent type of limiter that may engage and disconnect enabling a carrier 401 to rotate independently from a detent carrier 402 when the assembly is disengaged due to torque load. Torque limiter assembly 400 includes a plurality of safety modules 409 assembled to carrier 401 on a bolt circle and equally spaced apart radially about the surface of the carrier. In this application, safety modules 409 include torque piston components and commercial spring assemblies (not illustrated) and work in the same direction as the shaft or drive line.

Carrier 401 is an annular component that may be fabricated from AISI 1045 or a similar medium tensile steel. Detent carrier 402 is an annular component that may be fabricated from AISI 1045 of similar material. Safety modules 409 are largely of the same material with respect to housing components thereof. Safety modules 409 are each installed to carrier 401 using hardware such as socket head machine screws 413 and washers. At each installation point for a safety module 409, a through opening is provided to accept the torque pistons of each safety module there through. This enables the ball ends to contact detents is detent carrier 402. Each safety module includes a central torque nut for applying torque to each safety module. All of the safety modules 409 are adjusted to the same specification. The maximum torque specified for torque limiter assembly 400 is 30879.4 ft-lb where as a minimum torque specified is 5448.7 ft-lbs.

Torque limiter 400 includes a pair of key less locking devices 406. Torque limiter 400 includes a reset location plate 410 installed to the edge of module carrier 401 by a pair of rivets 411. Torque limiter 400 is not an automatic resettable torque limiter. In this application, the ball side of safety modules 409 engage with annular detents placed on the same bolt circle at the same angle of arrangement about detent carrier 402. Axial load above the collective torque forces the piston springs (not illustrated) in the safety modules 409 to compress as the balls are forced from the detents. Locking devices 406 may lock torque limiter assembly 400 in a state of disengagement until reset allowing carrier 401 to rotate independently from detent carrier 402.

Torque limiter assembly includes a pair of pliable bearings 404, similar to 104 and may be aligned concentrically in assembly one bearing at each side of the detent carrier 402. Pliable bearings 404 are annular rings with interfacing steps. Pliable bearings 404 may be fabricated from materials listed above for bearings 104. In one embodiment, bearings 404 may be manufactured from pliable 6 XHA. Pliable 6 material has a low coefficient of friction, high strength characteristic, high wear resistant characteristic, high temperature rating, and a high load resistance characteristic, while maintaining pliability.

Pliable bearings 404 are replacement bearings for standard metallic ball bearing rings and other metallic bearing types. Therefore, bearings 404 replace metal bearings making metal bearing obsolete in similar torque limiter applications. The use of pliable bearings 404 in torque limiter assembly 400 obfuscates the need for lubricant and eliminates potential brinelling under load component vibration. In another embodiment, bearings 404 may be manufactured from a higher grade carbon graphite material exhibiting higher temperature tolerance and self-lubrication. Bearings 404 are easily customized to any shape performing same job as metallic bearings known in the art in this industrial application. Bearings 404 are easily manufactured to suit and the described steps enable an increased load bearing surface. Bearing 404 can and would be manufactured to shapes and sizes not common to conventional roller/ball or metallic bearings typical to the industry. This provides unique advantages in design prohibitions with minimum restrictions as required.

Torque limiter assembly includes a pair of thrust washers 405 one at each side of the pair of pliable bearings 404 in assembly. Thrust washers support axial load, reduce thrust force and friction and provide a flat surface against each pliable bearings 404. In this application, thrust washers 405 may be fabricated from a high temperature and wear resistant polymer known as TIVAR HOT brand after the manufacturer, or similar material. Thus washers 405 may operate at higher than normal temperatures and may withstand higher compression loads than typical washers used to shield bearings. Torque limiter assembly 400 includes O-rings 407a and 407b for sealing the assembly against corrosive materials.

Figure 5A:
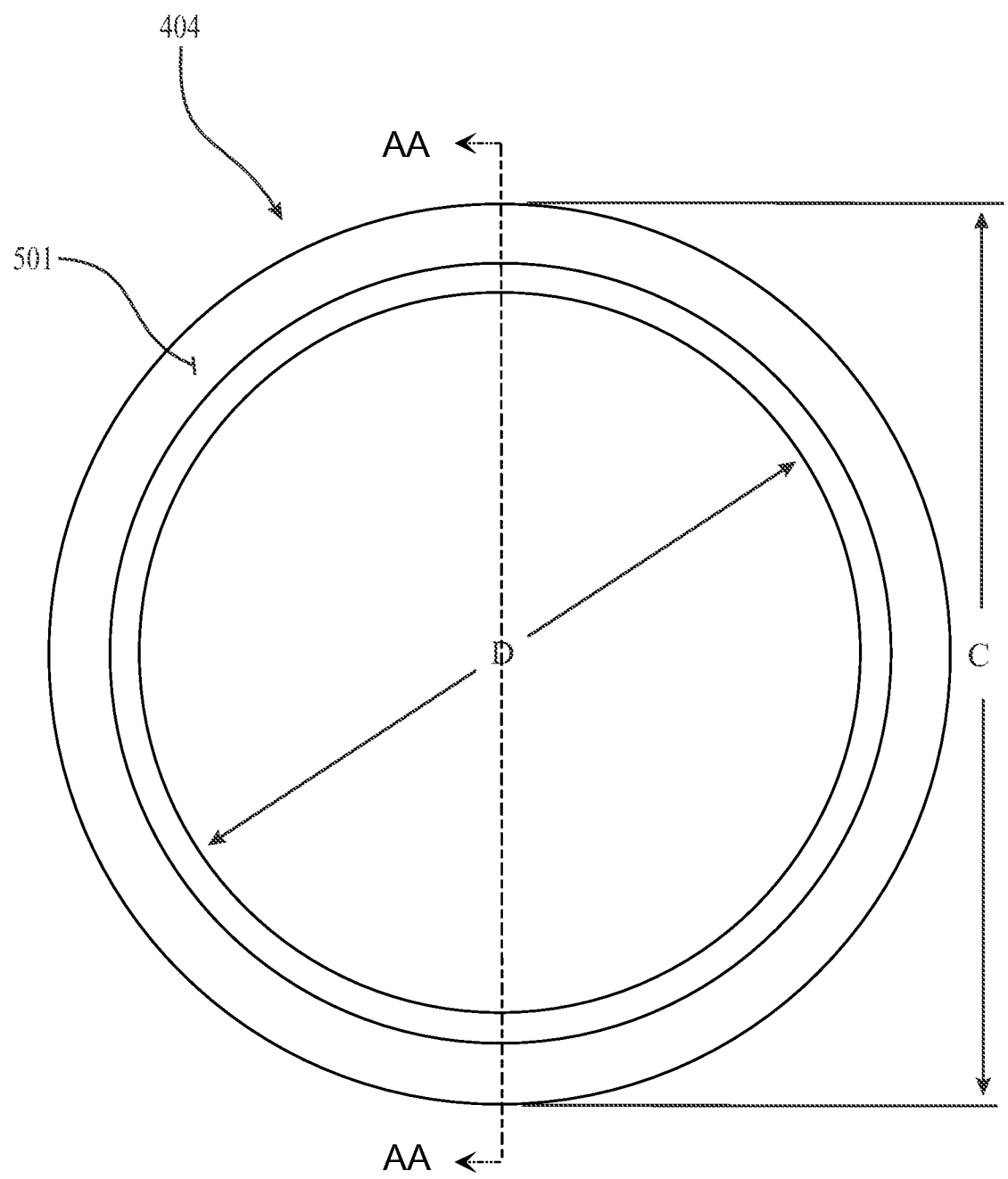
FIG. 5A is a top elevation view of a pliable bearing ring according to an embodiment of the invention.

FIG. 5A is a top elevation view of pliable bearing ring 404 of FIG. 4 according to an embodiment of the invention. Pliable bearing ring 404 may be manufactured from a high temperature polymer material 501 with a low coefficient of friction such as TIVAR HOT brand or from a high temperature carbon graphite material that is self-lubricating. In either case no bearing grease or lubrication is required. In the current application, continuous operating temperatures may exceed normal maximum operating temperatures of torque limiters in general by ten percent or more. In this application though not a limitation, bearing 404 has an outside diameter C of about 15 inches, an inner diameter D of about 12 inches.

Figure 5B:
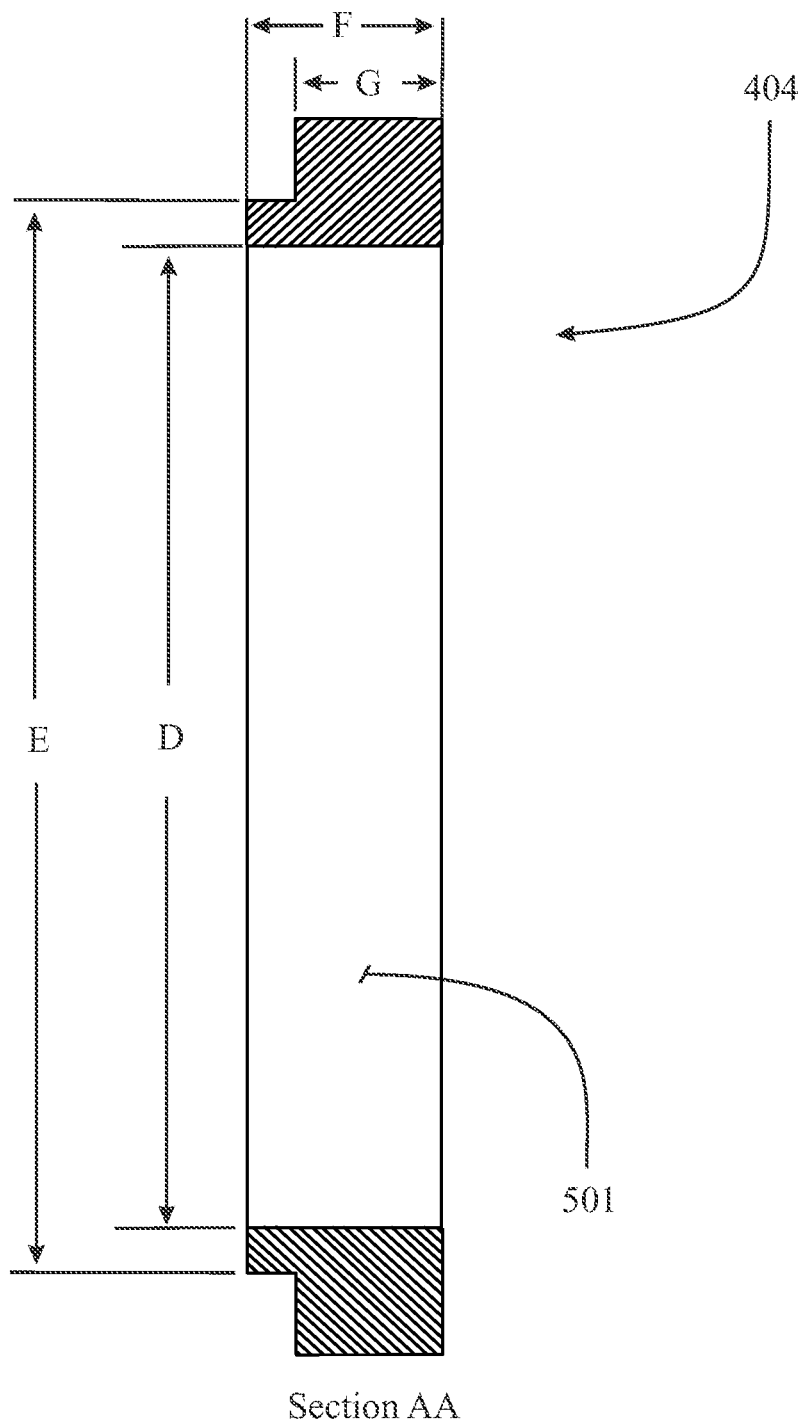
FIG. 5B is a sectioned view of the pliable bearing ring of FIG. 5A taken along section line AA.

FIG. 5B is a sectioned view of pliable bearing ring 404 of FIG. 5A taken along section line AA. Bearing 404 may be manufactured from material 501, which may be TIVAR HOT or an equivalent high temp polymer or from a high grade carbon graphite without departing from the spirit and scope of the present invention. Bearing 404 has an overall thickness dimension F of about 2.4 inches. Bearing 404 has a step-down thickness dimension G of about one and three-quarter inches. In this example inside diameter D is about 12 inches as described above. Bearing 404 has a step-down outside diameter E of about 13 inches.

Figure 6:
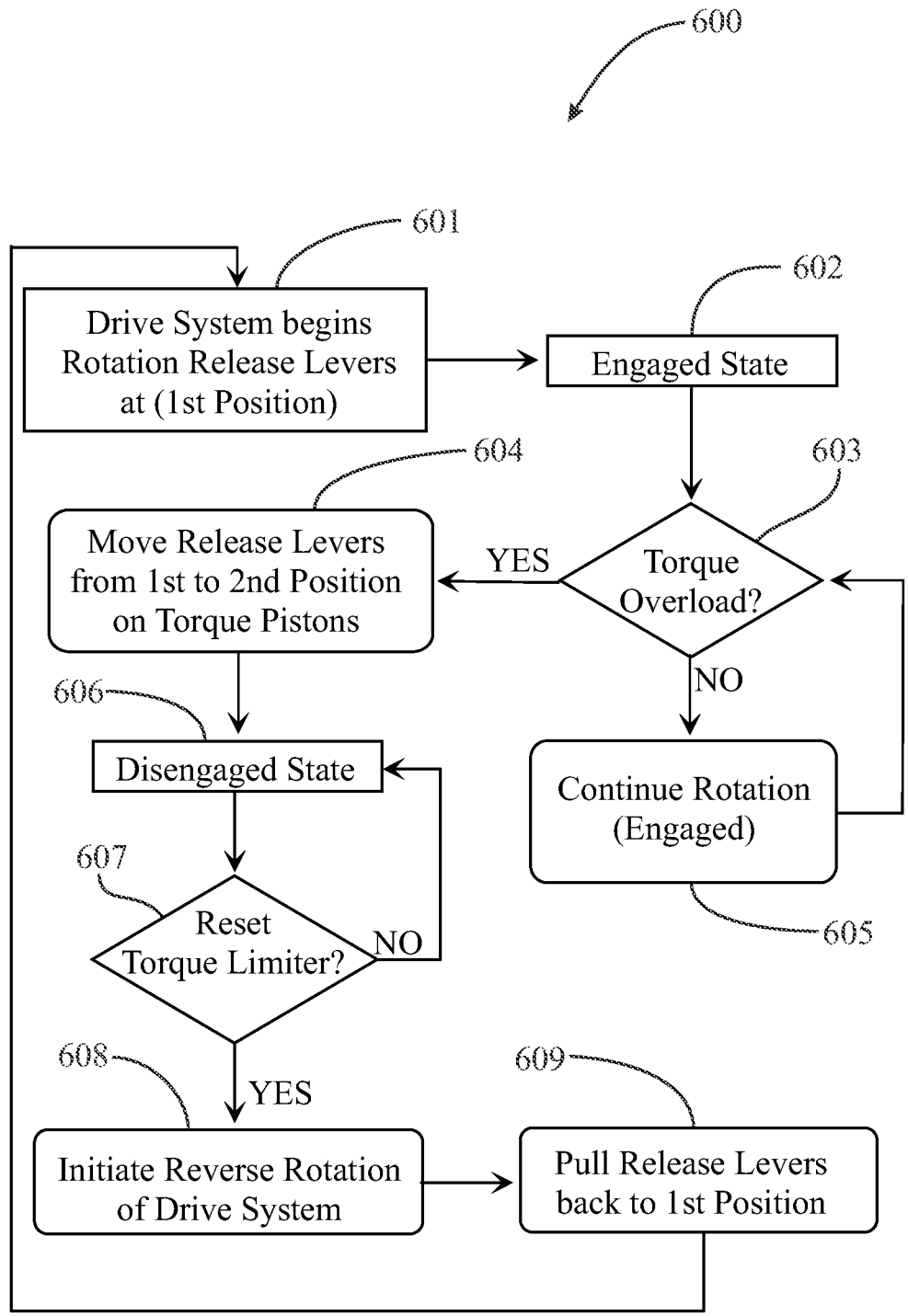
FIG. 6 is a process flow chart depicting steps for triggering disengagement and resetting thee torque limiter of FIG. 1A according to an embodiment of the present invention.

FIG. 6 is a process flow chart 600 depicting steps for triggering disengagement and resetting the torque limiter of FIG. 1A according to an embodiment of the present invention. Process flow 600 assumes that the torque limiter is fully installed and engaged and that a same torque threshold value is set for each of the disconnect assemblies of the torque limiter. At step 601, the drive system may begin rotation with the torque disengagement release levers maintained at a first position against the torque piston housings in all of the disconnect assemblies. The release levers are operated through the torsion spring as described in FIG. 3 relative to release levers 311 of disconnect assemblies 106. An engaged state exists at step 602 with both carrier components coupled, the assembly rotating in a same direction. Coupling occurs via the radiused ends of the tensioners in the disconnect assemblies advanced by spring tension in the torque piston into detents provided for the purpose in the piston carrier body at the same radial alignment.

At step 603 it may be determined whether the axial load transmitting from the drive component (tensioner carrier) into the driven component (piston carrier) of the assembly presents a torque overload beyond a threshold value acceptable for continuous operation of the drive system. If at step 603, it is determined that no torque overload is present, then the process moves to step 605 where the state of engagement remains for continuous operation. From step 605, the process loops back to step 603.

Torque overload is the amount of force required to cause the torsion springs to force movement of the release levers situated against the piston housings. If at step 603, the axial load on the driven component exceeds a preset threshold confirming a torque overload condition, the torsion springs force the release levers from the first position to a second position at step 604. In this process, the release levers are forced over a step down in diameter on the piston housings pushing the torque pistons away from the tensioners separating the components linearly and lifting the tensioner ball ends out of the detents on the piston carrier. The separation compresses the springs in the torque pistons and the second position of the levers locks the torque pistons in the compressed states. The process of step 604 results in a state of disengagement at step 606 stopping transmission of load into the driven component and allowing the driven component to rotate independently from the drive component until the rotation of the driven component stops.

At step 607 it may be determined whether the torque assembly will be reset resulting in re-engagement of the drive and driven component. If at step 607 it is determined not to reset, then the process loops back to the disengagement state 606. If at step 607, it is determined that the assembly will be reset, then at step 608 reverse rotation of the drive component is initiated while disengaged. At step 609, the reversal of rotation direction pulls the release levers back off of the step down diameters on the torque piston housings and back to their original positions via catching the release levers with reset levers introduced as element 314 in FIG. 3. Reset results in releasing the spring tension in the torque pistons resulting in re-engagement of the tensioners to the torque pistons resulting in the re-engagement of the driven component and drive component. The process may loop back to step 601 where rotation continues in the engaged state.

In a preferred embodiment, disengagement happens at the same instant in all of the disconnect assemblies as does re-engagement via the reset operation. In one embodiment of the present invention solenoid motors having electronics-based wireless communication capability may be provided to all of the disconnect assemblies connecting to the release levers wherein the solenoids may act upon the release levers to reset then to the first position engaging the driven component to the drive component at the receipt of a synchronized signal from a wireless controller. In such an embodiment, the wireless controller could reset the assembly to engage without reversing the drive direction of rotation. In the same embodiment, the controller may also be used with the solenoid motors to move the levers to the second position to disengage. In such an embodiment, a wired or wireless controller may have access to axial and radial load data in real time and the threshold value for torque overload may be set electronically instead of mechanically. Also in such an embodiment, an opportunity to generate charge within the assembly may be created with an Inductive coil, wherein the charge current may be routed to a battery power source for the drive system recharging the battery while the system is in operation.

It is noted herein that torque limiters such as torque limiters 400 of FIG. 4 or 100 of FIG. 1AB may scale up or down in dimensional size and torque load capacity without departing from the spirit and scope of the present invention. In one embodiment of the present invention bearing 404 may be used in place of metal bearings 104 of FIG. 2 above without departing from the spirit and scope of the invention. It will be apparent with skill in the art that the torque limiter assembly of the present invention may be provided using some or all the elements described herein. The arrangement of elements and functionality thereof relative to the torque limiter assembly of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A torque limiter comprising:
   a first rotational form mounted to a driving component of a rotational drive system;
   a second rotational form mounted to a driven component of the rotational drive system, the second rotational form adapted to interface with the first rotational form over an inner hub, the second rotational form adapted to be disengaged from the first rotational form and enabled to be reengaged to the first rotational form;
   a pair of ring bearings supporting rotation of the first and second rotational forms over the inner hub;
   a plurality of disconnect assemblies mounted at equally spaced positions radially about the first rotational form, the plurality of disconnect assemblies extending through a side wall of the first rotational form toward center of the first rotational form, the plurality of disconnect assemblies cylindrical in form including a tensioner housing, a piston, a tensioner, and a spring assembly concentrically aligned, the plurality of disconnect assemblies further including a torsion spring-operated release lever orthogonally positioned to the longitudinal direction of the rotational drive system;
   characterized in that the plurality of disconnect assemblies function in unison to disengage the second rotational form from the first rotational form upon detection of a transmission torque overload beyond a threshold torque value set in torque adjustments made to the individual ones of the plurality of disconnect assemblies.

2. The torque limiter of claim 1, wherein the driving component is a drive shaft.

3. The torque limiter of claim 1, wherein after disengagement of the second rotational form from the first rotational form, reengagement of the forms occurs by reversing direction of the rotational drive system.

4. The torque limiter of claim 1, wherein after disengagement of the second rotational form from the first rotational form, reengagement of the forms may be performed manually with the rotational drive system in a neutral state.

5. The torque limiter of claim 1, wherein individual torque adjustment nuts are provided to each of the plurality of disconnect assemblies to enable application of a torque threshold value to the plurality of disconnect assemblies.

6. The torque limiter of claim 1, wherein the pair of ring bearings are annular ball bearing rings manufactured of a semi-pliable material from a list including nylon, pliable polymers, metallic materials and graphite.

7. The torque limiter of claim 6, wherein the pair of ring bearings are separated on the central hub by a press ring disposed there between them over the hub.

8. The torque limiter of claim 1, wherein after disengagement of the second rotational form from the first rotational form, reengagement may occur within a span of one reverse revolution of the driving component.

9. The torque limiter of claim 1, wherein the spring assembly includes two springs and two spring sleeves wherein the spring sleeves are disposed to the inside diameters of the springs and wherein one spring has an outside diameter small enough to fit inside of an inside diameter of the other spring.

10. The torque limiter of claim 9, wherein in each of the plurality of disconnect assemblies, the spring assembly is disposed within the piston and wherein the torsion spring-operated release lever is forced to pivot to occupy a step-down ledge on the piston locking the compression spring assembly within the piston into a compressed state separating the piston from the tensioner disengaging the second rotational form from the first rotational form.

11. The torque limiter of claim 10, wherein each of the plurality of disconnect assemblies further include a rotationally dampened reset lever adapted to engage the release lever during reverse rotation of the first rotational component pulling the release lever off the step-down ledge on the piston housing releasing the piston to reengage the tensioner.

12. The torque limiter of claim 1, wherein the pair of ring bearings are flat rings with no moving parts.

13. The torque limiter of claim 12, wherein the pair of ring bearings are fabricated from a temperature specific polymer material.

14. The torque limiter of claim 12, wherein the pair of ring bearings are fabricated from a graphite material.

15. The torque limiter of claim 1, wherein the tensioners have ball ends that engage detents provided in co-aligned spacing around the second rotational form.

16. The torque limiter of claim 1, wherein torque overload above a preset value is detected in each of the plurality of disconnect assemblies simultaneously via the torsion spring connected to the release lever.

17. The torque limiter of claim 16, wherein upon torque overload breech, compression in the torsion springs force the release levers onto step-down ledges of the pistons simultaneously linearly separating the pistons from the tensioners lifting the ball ends of the tensioners from the detents in the second rotational form.

* * * * *